March 31, 1964    R. L. HOLLINGSWORTH    3,126,581
SECTIONAL SEALED-OFF INFLATED LINEAR TUBING AND EXTRUDING
AND SEALING MEANS FOR MANUFACTURING PURPOSES
Filed Jan. 18, 1961
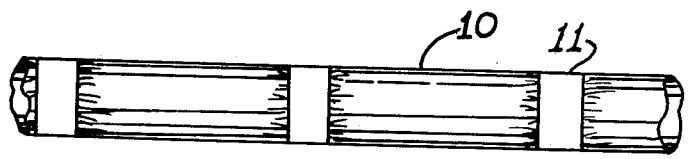
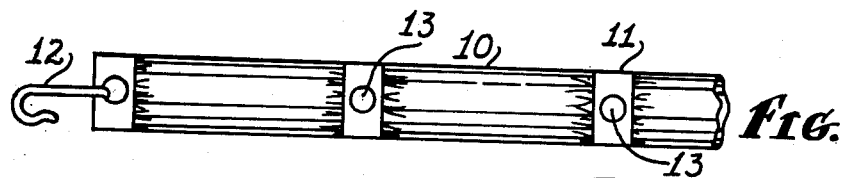
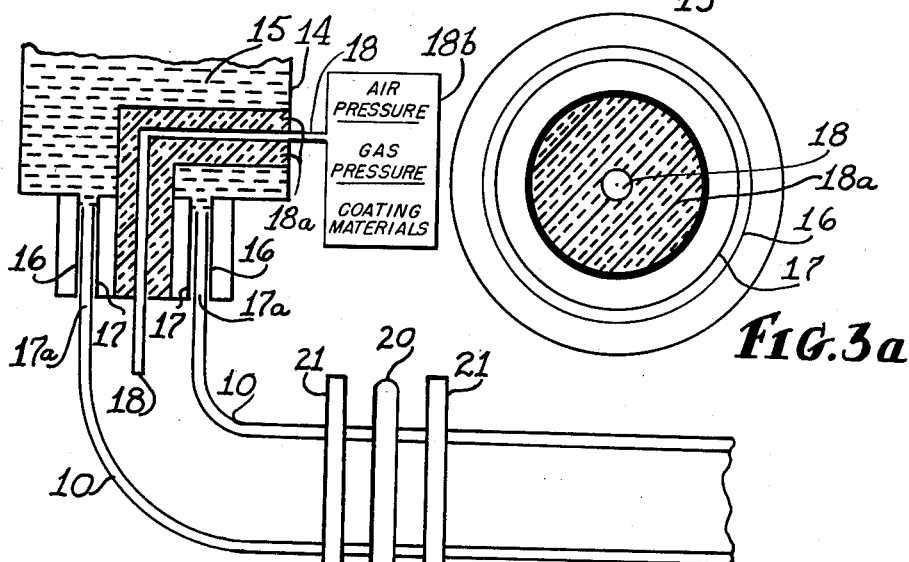
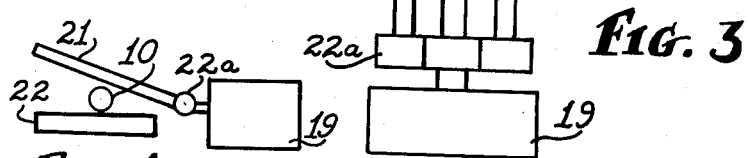
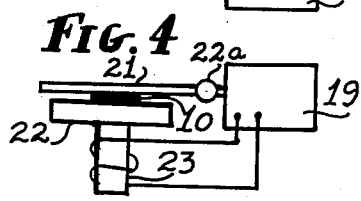
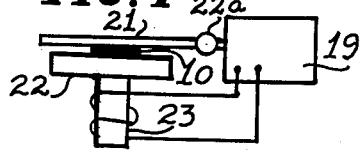
R. Lee Hollingsworth    INVENTOR.

United States Patent Office 3,126,581
Patented Mar. 31, 1964

3,126,581
SECTIONAL SEALED-OFF INFLATED LINEAR TUBING AND EXTRUDING AND SEALING MEANS FOR MANUFACTURING PURPOSES
R. Lee Hollingsworth, Massapequa, N.Y.
(514 Hempstead Ave., West Hempstead, N.Y.)
Filed Jan. 18, 1961, Ser. No. 83,500
1 Claim. (Cl. 18—14)

The present invention relates to simplified means to protect swimmers and life at sea in general. The invention comprises sealed-off sections of a linear inflated tube forming a throw line or a rescue line for use in rescue work that has considerable positive buoyancy and a diversification against the total loss of air. The invention also comprises a hand throw line for fishing that floats on top of the water wherein a fishing sinker of a given weight near a fish hook allows one to fish to a given depth depending on the sinker weight and the air capacity of the line, and for this use the line floats to the point over the fishing hook, and acts as a combination line and float. When a fish bits, the indication is visible all along the floating line.

When the inflated line is carefully made into a roll and tied it can be thrown to one in distress much the same as a life preserver without the danger of injuring the person in distress.

Another purpose of the invention is to provide a new means with which to protect swimmers and comprise a "Save-A-Life" means for general safety and use by people working on and around water.

Another purpose is to provide within some of the attachable or sealed-off sections of the tube means, shark repellant and to hold water, food and weapons to help people survive for a longer period of time when they are required by circumstance to take to the water.

Another purpose of the invention is to provide novel means for extruding plastic tubing to inflate and seal-off the tubing into permanent inflated sections.

Another purpose is to provide means of extruding for coating or annealing and air or gas cooling the tubing in general as it is extruded.

Other purposes are apparent and obvious when considered in relation to the description of my invention.

The description of the present invention follows with reference to the drawings wherein, FIGURE 1 is a plan view;

FIGURE 2 is a plan view of a modification of FIGURE 1;

FIGURE 3 is a schematic view of a method for manufacturing the present invention;

FIGURE 3a is a bottom view of a portion of FIGURE 3;

FIGURE 4 is a side view of the holding and sealing mechanism of FIGURE 3, when opened to allow the inflated tubing to move through the sealer to the next point to be sealed;

FIGURE 5 is a side view of the sealing apparatus of FIGURE 4 while the inflated tube is being pressed together and sealed-off into sections in one linear tube.

The detailed description of my invention follows with reference to FIGURE 1. Like parts are indicated and identified by the same reference numerals in the various drawings and in the description of the invention. The body of the sealed-off inflated tubing is shown at 10, and the relative position of the seals along the tube between the sealed-off inflated sections is indicated at 11. This tubing is made in a continuous flow from the extrusion dies in a manner illustrated in FIGURE 3. A twenty foot length of this tubing with about six sealed-off inflated sections having an inside diameter of one inch (as example) has substantially six hundred cubic inches of air in the sealed-off inflated sections. Therefore, a person could quickly wind this twenty foot length of tubing around his shoulders and body and securely tie or hook the ends together (see FIGURE 2) and be able to remain afloat indefinitely.

FIGURE 2 is substantially the same as FIGURE 1 except that the tube has a hook 12 in one end of the tube to facilitate fastening the end to any object or to quickly hook through eyelets 13 which are placed through the seals 11. This forms a convenient hook and eyelet means to avoid the necessity of tieing the ends together as required by FIGURE 1.

A substantial length of the type of tubing shown in either FIGURE 1 or FIGURE 2 is aptly named "Save-A-Life" as this could be of inestimable value if carried to the river, lake, seashore or the old swimming hole by boys and girls to assist anyone in trouble or when drowning, with less danger to the rescuers. This device may be used to float any object by tieing or hooking the inflated tube to the object. A canoe or small boat may have the tubing fitted around its edge or at another convenient area to render the craft unsinkable. If tied to an outboard motor, as another example, the motor would not sink. A soft rubber ball-like unit may be hooked or tied to the end of the tube to provide a means for casting the end of the line a distance towards one in distress without the chance of injuring the distressed person.

This tube means may be made in various sizes and lengths, and various materials such as rubber, plastics or other suitable materials, and the method of making is not limited to extruding. However this appears to be the best means of manufacture. The tube may, for example, be made in sizes as small as one-eighth inch in in side diameter, and be used for casting and heaving lines, since plastic materials have become strong and durable.

A person may fish to a given depth depending on the weight of the bait, hook and sinker using the inflated line which provides a float that is sensitive to fish bites that can be seen along the length of line as it floats on the water.

In making this tube, a novel means has been invented for inflating and cooling the tube as it is extruded through the die. FIGURES 3, 3a, 4 and 5 show this feature of the invention. Tank 14 is disposed to hold a heated solution of plastic material 15, for example, which flows through the die, which has an outside wall 16, and an inner center unit 17 to form a circle die or passage area 17a to allow the hot plastic material 15 to pass through, forming the round tube 10. To inflate the tube as it passes through the die, I have provided air tube or line 18 that extends to an air pressure supply 18b which also represents a supply of gas and coating material, which extends via pipe 18 from 18b in the opposite direction through the wall of tank 14 and passes through the inner portion of the die 17. As this tube passes air through the hot plastic or molten material 15, it is housed in heavy heat insulating material as indicated by 18a, to prevent the cooler air from interfering with the extruding process through the die. The air is passed in sufficient quantity to cool and inflate the tube before it passes through the intermittent sealing mechanism 19. The air may be heated to the required degree if so desired, and it may be rigidly controlled as to humidity as required for special purposes of extrusion. Sealing mechanism 19 comprises one of several known means for applying heat to an object to heat seal same at the required temperature for sealing the inner walls of the tubing together by heater element 20, which may be an electrically heated rod or blade like unit, which provides the seal while holder units 21 presses and flattens the walls together on plate 22 during the sealing process. Sealing blade 20 and holder 21 operate by lever means as rigged and desired, and moves up and down from joint 22 preferably automatically to intermittently seal the tube 10 as it passes through the sealing mechanism. The blade sealer unit 20 may be a high frequency sealing device of known usage if desired and caused to operate up and down to affect the intermittent seals along the inflated tube.

FIGURE 3a shows a bottom view of the die showing the air passage 18 surrounded by heavy insulation 18a and the die mouth or ring between the outer die wall 16 and the inner wall of die section 17.

FIGURE 4 shows the tube 10 before it is flattened and sealed.

FIGURE 5 shows the squeezed and flattened position of the tube 10 while the intermittent sealing process is accomplished. Holding units 21 are preferably made of magnetizable material and are preferably energized magnetically by the electric magnet 23 after they are in the pressed position to automatically be held in the holding position for an instant after the sealing blade 20 is lifted to allow an instant of cooling time before the holding units 21 raise to allow the tube to be moved to the next position along the tube to be sealed. During this holding period a burst of cooling air may be directed upon the seal. The timing relay mechanism to operate the electromagnet 23, and the power mechanism to operate holding units 20 and 21 to do the pressing and sealing comprises known mechanical power means to do this pressing, sealing, holding and releasing necessary to this accomplishment.

While I have illustrated and described the new "Save-A-Life" inflated, intermittently sealed-off tubing for the general purposes intended, the means of FIGURE 3 comprises an important part of the present invention particularly the method and means for inflating and cooling with air, the tubing as it passes through the extrusion die, and heat insulating this air tube as it passes through the hot material and through the center of the die.

It is to be appreciated that the extruding means of FIGURE 3 may be utilized in extruding metal seamless tubing whereby cooling air is sent through a heavily insulated cooling air line that passes through the molten metal to be extruded, and thence through the center of the extrusion die to carry cooling air and annealing materials to the inside of the pipe as it is extruded, and there may be, more than one line passing through this insulation and through the center of the die as required to carry cooling air and gases, and annealing or other coating materials such as a coal tar product coating.

Other and additional uses and functions will be appreciated by those skilled in the art by reference to this specification and the appended claim. Additional modifications and variations also will be appreciated by those skilled in the art without departing from the spirit or scope of this disclosure.

I claim:

An apparatus for extruding, cooling, inflating and sectionally sealing tubing which comprises a tank which contains the material to be used in a molten state, said tank having a circular portion extending downward from the bottom thereof, a circle unit disposed within said portion defining a circular die between the unit and the portion for extrusion of the material, a pipe one end of which is attached to a source which provides cooled air under pressure, the pipe extending through said molten material and downward through said die so that the opposite end extends into the interior of the extruded tubing, the portion of said pipe which passes through said molten material being insulated so that the cooled air and molten material have a minimal effect on one another, and heat sealing means which comprises a plate over which the extruded tubing to be heat-sealed passes, a heat source, a heater element longer in length than the diameter of the tubing attached to said heat source and extending over said plate, the longitudinal axis of said element being perpendicular to the longitudinal axis of the tubing, and holder units positioned on either side of said heater element and connected to said heater element at the end opposite that which contacts the tubing, said heater element and said holder units being attached to said heat source to provide unitary movement into and out of contact with said tubing at predetermined intervals.

References Cited in the file of this patent

UNITED STATES PATENTS

| | | |
|---|---|---|
| 2,536,847 | Harrow | Jan. 2, 1951 |
| 2,575,138 | Slaughter | Nov. 13, 1951 |
| 2,668,323 | Johnson | Feb. 9, 1954 |
| 2,870,486 | Wagner | Jan. 27, 1959 |
| 2,889,581 | Vanderhoof | June 9, 1959 |
| 2,970,326 | Keefe | Feb. 7, 1961 |
| 3,035,302 | Lysobey | May 22, 1962 |
| 3,057,013 | Lovelus | Oct. 9, 1962 |